Sept. 28, 1954     O. HUBMANN     2,689,977
MEANS FOR BRIQUETTING FINELY GRANULAR MATERIAL, AND
MORE ESPECIALLY TO AN IMPROVEMENT IN THE MOLDING
EQUIPMENT OF RING-ROLLER MOLDING PRESSES Filed Jan. 17, 1951     2 Sheets-Sheet 1

INVENTOR
Otto Hubmann

BY Burgess & Dinkelage
ATTORNEYS

Sept. 28, 1954   O. HUBMANN   2,689,977
MEANS FOR BRIQUETTING FINELY GRANULAR MATERIAL, AND
MORE ESPECIALLY TO AN IMPROVEMENT IN THE MOLDING
EQUIPMENT OF RING-ROLLER MOLDING PRESSES
Filed Jan. 17, 1951   2 Sheets-Sheet 2

INVENTOR
Otto Hubmann

BY Burgess + Dinklage
ATTORNEYS

Patented Sept. 28, 1954

2,689,977

UNITED STATES PATENT OFFICE 2,689,977

MEANS FOR BRIQUETTING FINELY GRANU-
LAR MATERIAL AND MORE ESPECIALLY
TO AN IMPROVEMENT IN THE MOLDING
EQUIPMENT OF RING-ROLLER MOLDING
PRESSES

Otto Hubmann, Bad Homburg (Taunus), Hesse,
Germany

Application January 17, 1951, Serial No. 206,322

Claims priority, application Germany
January 23, 1950

6 Claims. (Cl. 18—9)

This invention relates to means for briquetting finely granular material, and more especially to an improvement in the moulding equipment of ring-roller moulding presses.

Ring-roller moulding presses consist essentially of a rotating press ring and a rotating pressure disc inside the press ring, on a bearing eccentric to the axis of the ring. An open groove, facing inwards, runs round the press ring, there being a projecting ring on the periphery of the pressure disc to fit into said groove. This ring and groove form the moulding equipment of the press, in which the moulded product is formed. The projecting ring closes the groove on its open side, so that a moulding channel is formed by the bottom and sides of the groove and the curved surface of the ring on the pressure disc in the zone of pressure, the height of which moulding channel gradually decreases until it becomes equal to the smallest distance between the bottom of the groove and the curved surface of the ring, after which it increases again in the same manner. On either side of the zone of pressure, the ring on the pressure disc does not penetrate the groove. On one side of the zone of pressure are devices for feeding the material to be formed into briquettes and on the other side of said zone are devices for removing the same from the groove. The moulding groove can also be arranged around the periphery of the pressure disc, the ring which, by penetrating into the groove in the zone of pressure, applies the pressure, being arranged on the inside of the press ring.

The material fed into the moulding channel is carried along by the rotating parts and is pressed into briquettes until that point is reached where the distance between the curved surface of the ring and the bottom of the groove is smallest. As this point is passed, in the direction of rotation, the pressure diminishes. At first the briquettes will undergo a definite expansion so that their final cross-section will always be slightly greater than the smallest cross-section of the moulding channel. Due to this expansion the briquette will fit comparatively tightly into the groove, so that its removal out of the groove can cause difficulties. These are experienced especially with moulding channels of rectangular cross-section in which the sides of the groove are perpendicular to the axis of rotation, the curved surface of the ring being perpendicular to the sides.

Attempts have been made to remedy this drawback by arranging the groove so that two briquette strips are formed parallel to each other. In such an arrangement, the pressure disc has a projection of rectangular cross-section between its two surfaces by means of which pressure is applied, which fits into a recess between the two grooves. In the zone of pressure the moulding channels are thus formed by the bottoms and sides of the two grooves, the two pressure surfaces of the pressure disc and the sides of the annular projection. Outside the zone of pressure said annular projection is progressively withdrawn from the recess and the groove, until the adjacent sides of the briquette strip become free, since the axis of rotation of the pressure disc is eccentric to the axis of rotation of the press ring rotating on rolls. Although two of the bounding sides now lie free, the briquette strips still adhere so tightly to the moulding groove that their removal is difficult. This defect could only be remedied by rounding off the moulding groove at the point where the bottom and side face join. In such case it had to be reckoned with that part of the briquette strip became overpressed. This overpressing caused, in particular, cracks at those corners of the briquettes which, in the mould, lay against the sides of the moulding groove.

The present invention aims at providing for an easier removal of the moulded bodies from the moulding groove of ring-roller moulding presses.

The present invention contemplates the solution of the problem by using a mould in which the moulded bodies are loosened from the groove immediately the pressure diminishes, by the assistance of the natural expansion of the highly compressed product.

According to the invention the moulded bodies are produced, for instance, in pairs so that, after the moulding operation, they lie in the bottom of the groove, in two parallel, symmetrical strips, one of which is disposed on one, and the second on the other side of the centre plane of the groove, and so that both are substantially inclined to the centre plane of the groove. The two inclined, parallel briquette strips are joined by a narrow rib in the middle of the groove. As the ring, by means of which the pressure is applied, is withdrawn from the groove this rib is easily broken by the expansion of the briquette and the two strips lie loosely in the bottom of the groove so that they can be easily pushed out, for example by the use of a spur. In order to divide each strip into single briquettes the mould may be provided with transverse ribs.

Instead of a spur, a resilient ring may be arranged at the bottom of the groove, e. g. loosely inserted, and thus forming part of the mould, by means of which ring the briquettes are pushed out of the groove. For this purpose the resilient ring has a somewhat greater diameter than the bottom of the groove in the case where the groove is arranged on the pressure disc, or a smaller diameter than the bottom of the groove in the case where the groove is arranged in the inside of the press ring. As the pressure is applied in the zone of pressure, the ring is resiliently pressed against the bottom of the groove in the pressure disc or the press ring, dependent on the arrangement. Outside the zone of pressure, on the opposite side, the ring lifts up from the bottom of the groove to a distance corresponding to the difference between the diameters.

The breaking off of the moulded bodies from the endless strip and the orderly removal from the bottom of the groove is facilitated, according to the invention, by slightly widening the groove at the bottom towards the sides in such a manner that, by virtue of the pressure of the resilient ring, the moulded bodies are forced together towards the central plane of the groove by a wedge-like action, whereby the two strips may be effortlessly separated into individual briquettes. This design of the moulding groove has the additional advantage that it is extremely resistant to wear, so that even when using the extremely high pressures and difficult e. g. sand-containing materials, an extremely long life of the forming tools can be relied upon.

Two or more moulds can also be arranged in the moulding groove so inclined to the centre plane of the groove or mutually displaced, that the bottom surface of one mould on that side adjacent to the other mould lies a suitable distance, e. g. more than half the height of a briquette above the bottom surface of the other. In this arrangement of the moulding equipment the expansion of the briquettes, as the pressure is relaxed, also facilitates the removal of the briquettes from the groove by the two strips moving over each other. In this case also loose rings lying in the groove which further facilitate the removal of the briquettes from the groove, can be used. This arrangement of the apparatus has the further advantage that particularly homogeneous briquettes may be produced. The arrangement is particularly suitable for high pressures e. g. greater than 2000 kg. per cm.² as a result the sides of the mould can now be made parallel to each other, so that the overpressing of the briquettes is wholly avoided by the resultant equality of the paths of compression which is the necessary condition for the use of high pressures.

For example the mould can be so arranged that there are formed therein two strips in staggered relation with respect to their distance from the axis of the press, which strips are interconnected by a narrow rib. As the pressure is relaxed, owing to the expansion of the moulded bodies, the adjacent edges thereof will slide over each other. The rib is thus broken and the moulded strips lie unstressed in the groove.

Further advantages accrue from arranging two or more moulding channels inclined to the radial central plane of the press ring or pressure disc. Thus a lateral pressure on the groove, and thus also on the pressure disc, can be avoided if the outer edges of the projection penetrating the groove are formed as circles of equal diameter. This arrangement also enables the production of briquette strips of uniform cross-section, and offers an added security against overpressing occurring at any point in the cross-section of the briquettes For the use of high moulding pressures as required for example in the manufacture of coal briquettes without the aid of binders, the briquettes can also be formed in only one row or one single strip in such manner that the briquettes are produced alternately inclined to the right and to the left. In this fashion the width of the groove is substantially reduced. The moulded bodies lying in one row alternately inclined to the right and to the left are connected by a narrow rib and expand, as the pressure is relaxed or taken off, alternately in like manner towards the middle of the groove, i. e. face to face, accompanied by relaxation of the strain and the breaking of the connecting rib between each moulded body. This design of the groove further permits the production of large briquettes such as are suitable for metallurgical purposes e. g. for the production of blast furnace coke by the dry distillation of the briquettes or for the production of locomotive fuels. In this design also a loose ring arranged at the bottom of the groove facilitates the removal of the products. The action of the ring may be improved in all the aforedescribed applications by using two or more rings inside each other so that in spite of a high elasticity the smooth fitting of the ring into the bottom of the groove under the moulding pressure is insured.

In order to enable the invention to be more readily understood, reference is made to the accompanying drawings in which.

Figure 1:
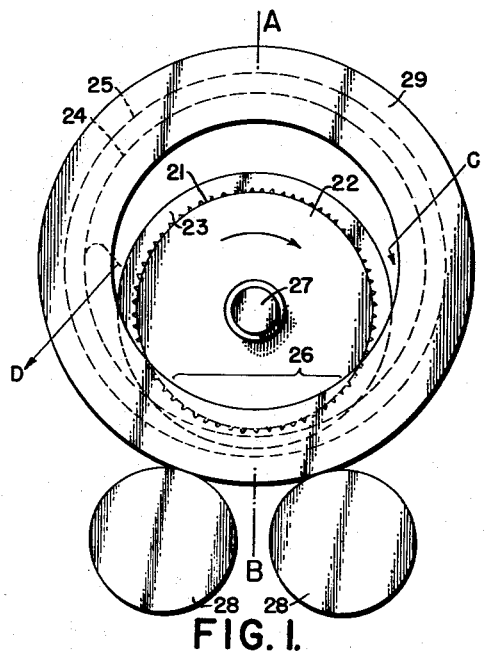
Fig. 1 is an elevation of a ring roller moulding press of normal construction.

Inside the ring 1, a pressure disc 2 is arranged so as to rotate eccentrically to the ring. Ring 1 carries the annular ram 5 which penetrates into the pressure disc inside the zone of pressure. The design of this annular ram is such that by means of a high rib 9 on the ram, the two briquette strips 7 are formed in the bottom of the groove and are interconnected only by a narrow rib 10. These strips are subdivided into individual briquettes in a radial direction by the ribs 8. A loose ring 6 is placed in the bottom of the groove, whose inner diameter differs by e. g. 10 mm. from that of its support. The pressure disc is made in two parts in order to accommodate this ring, the ring 3, forming one side of the groove, being secured by screw-thread 4.

Figure 6:
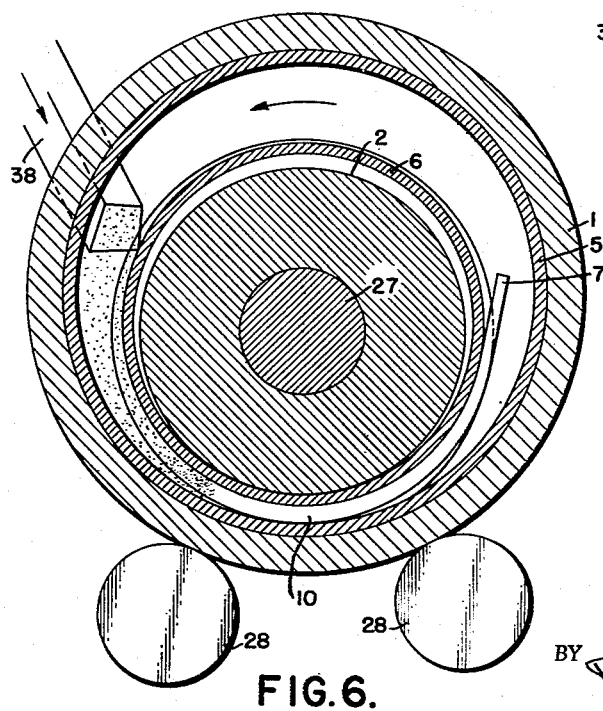
Fig. 6 is a vertical section taken along line C—D of Fig. 3.

The material is continuously fed into the opened groove of the pressure disc in a known manner during the operation of the press. As the rotating annular ram 5 penetrates the groove inside the zone of pressure, the material is compressed so that the moulded bodies are produced in the bottom of the groove. After the zone of pressure is passed in the direction of rotation, the annular ram 5 is withdrawn again from the groove, the two moulded strips 7 then expand towards the centre line of the groove in such a manner that the connecting rib between the two strips breaks and the stress between the moulded bodies and the walls of the mould is relieved. The loose ring 6, as shown in Fig. 6, now presses from beneath against the moulded bodies, as the pressure disc continues to rotate, pushing them out of the groove, since the ring, on account of its larger diameter must lift up from the bottom of the groove as soon as the pressure applied by the ram ceases. The two strips are thereby divided into single bodies which can then fall out of the groove as this rotates. The increasing pressure at the beginning of the zone of pressure again causes the loose ring to lie smoothly against the bottom of the groove in the pressure disc so that it can stand high moulding pressures of for example between 2000 and 2500 kg./cm.² without overtraining.

Figure 3:
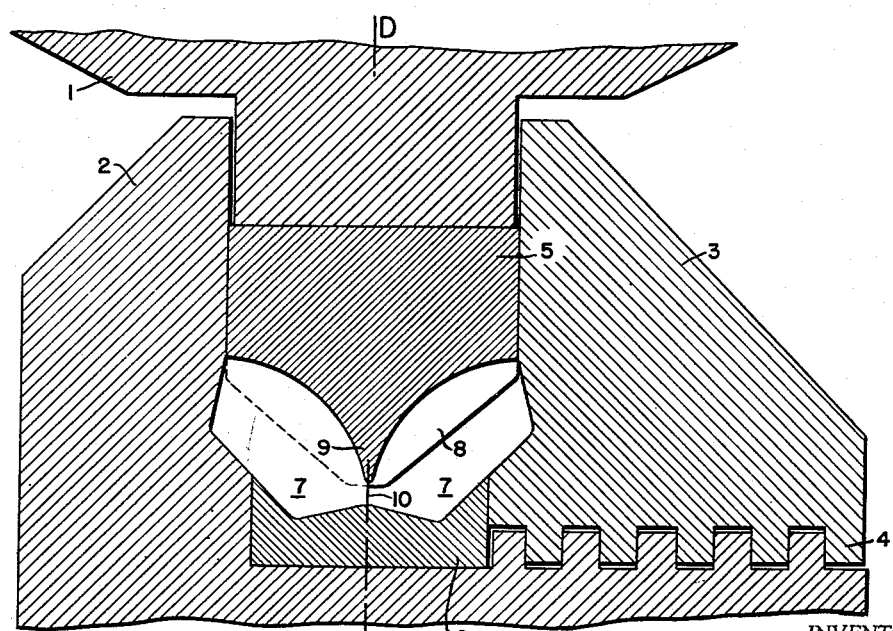
Fig. 3 illustrates in section one embodiment of moulding equipment in accordance with the invention.

Fig. 6 is a vertical section taken along the line C—D of Fig. 3. In Fig. 6 the fine-grained material to be molded into briquettes is shown passing down into the device at 38. As may be seen from Fig. 6, the inner diameter of the loose ring 6 is greater than the outer diameter of the pressure disc 2. At the point of compression of the briquettes, the ring 6 is forced towards the axis of rotation of the pressure disc 2, and thus pressed to the bottom, forming the bottom surface of the briquetting channel of the disc 2. At points around the circumference of the disc 2 in either direction from the point of greatest pressure, due to its greater diameter, the inner surface of ring 6 moves away from the bottom of the pressure channel, forming a space between disc 2 and ring 6 which reaches its greatest value 180° from the point of greatest pressure. As the pressure disc continues to rotate, compressing the granular material so that molded bodies are produced in the bottom of the groove, as described above, the loose ring 6 constantly separates from the outer surface of ring 2 at constantly shifting points, due to the eccentricity of rings 2 and 6. Thus, in effect, the loose ring 6 presses up against the newly formed briquettes as the pressure disc 2 continues to rotate, and the briquettes are forced out of the groove and are freed without binding.

Figure 4:
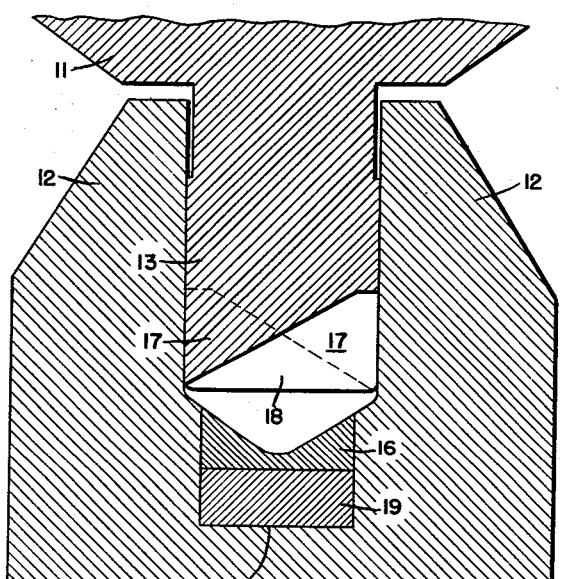
Fig. 4 illustrates in section a second embodiment.

In the embodiment shown in Fig. 4, the annular ram 13 of the press ring 11 is chamfered alternately to the right and to the left so that briquettes 17, alternately sloping to the right and to the left, are produced in the bottom of the groove, arranged in the pressure disc 12. In this case the pressure disc 12 is made in two parts for the better accommodation of the rings 16 and 19 which are arranged in the bottom of the groove. The annular ram 13 is furnished with projecting ribs 18, between the moulds forming the individual briquettes 17, so that the moulded bodies are separate, except for the small connecting rib, and aid in increasing the strength of the ram. The loose rings 16 and 19 are fitted closely inside each other. The inner diameter of the ring 19 is, however, larger than that of the bottom of the groove 14 in the pressure disc on which it lies during the moulding operation within the compass of the narrowest point in the moulding channel.

The moulded bodies 17 are produced in the groove if, during the operation of the press, this is filled with material. As the point of narrowest cross-section of the moulding channel is passed, the moulded bodies expand due to the withdrawal of the annular ram, towards each other i. e. towards the central plane of the groove. They thereby become loosed from the groove, and the rib connecting them breaks. As they become detached from the bottom of the groove, the rings 16 and 19 are then easily able to throw the moulded bodies out of the groove.

Figure 2:
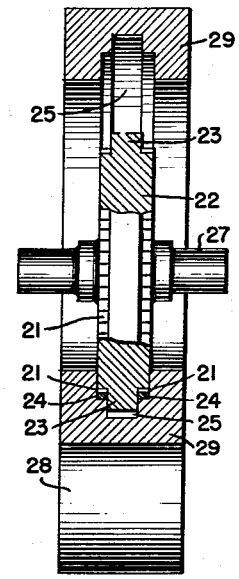
Fig. 2 is a section along the line A—B of Fig. 1.
Figure 5:
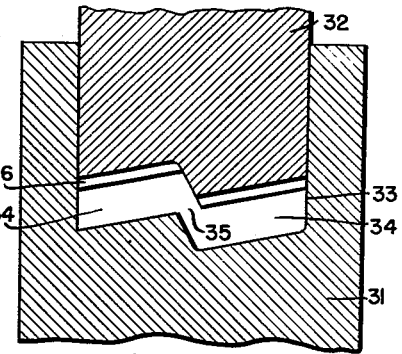
Fig. 5 is a radial section of still a further embodiment.

Fig. 5 illustrates an embodiment in which the groove 33 is milled into the pressure disc 31, the axis of which, as shown in Figs. 1 and 2, is arranged eccentrically to the axis of the press ring, which contains inside it the ring 32. The groove 33 in the pressure disc and the ring 32 form, inside the zone of pressure, the moulding channel, the height of which gradually diminishes and then is enlarged again.

The feeding mechanism (indicated by arrow C in Fig. 1) of normal construction such as for example, a chute or centrifugal wheel, feeds the material to be moulded into the moulding channel. The briquettes leave the moulding channel in the direction denoted by the arrow D in Fig. 1, by means of a normal type of discharge mechanism, e. g. a rigidly fixed spur against which the briquettes are carried. The moulding channel is so designed in cross-section that two briquette strips 34 are formed which are separated only by a small rib 35. As the point of narrowest cross-section is passed in the direction of rotation and the pressures relaxes, the moulded strips expand out from the sides of the groove towards the centre. The connecting rib between the two strips is thereby broken, and the two strips slide over each other so that they can easily be taken out of the groove.

The moulded strips can be divided laterally in accordance with normal practice. In such case suitable transverse ribs 36 are arranged on the surface by which pressure is applied on the groove.

The invention is applicable to all types of ring-roller moulding presses in which one or more pressure discs rotate inside a ring.

The present invention enables a simple construction to be employed, and, with the use of extremely high pressures, the production of moulded bodies without any binder, or in difficult cases with very little binder, such as brown-coal, coal or peat or also mixtures of such materials with ores or the like, as well as many other materials.

What I claim is:

1. In an apparatus for briquetting finely granular or pulverulent materials in a briquetting space defined between a press ring and a pressure disc eccentrically positioned within said press ring, the improvement which comprises the press ring and pressure disc dimensioned and positioned to define therebetween a briquetting mould shaped for producing at least two rows of briquettes, the briquettes of each row being inclined to a plane passing through the center of the mould, and the briquettes of one row being connected to adjacent briquettes of another row by an interconnecting bridge, whereby the interconnecting bridge will break upon the opening of the mould due to the expansion of the briquettes.

2. Improvement according to claim 1, in which said briquetting mould is shaped for producing two rows of briquettes, the portion of the mould for producing each row of briquettes being so inclined toward said plane and relatively displaced that the bottom surfaces thereof differ in height by more than one-half the thickness of the briquettes produced.

3. Improvement according to claim 2, in which said mould is defined by a groove on one of said press ring and pressure disc and a land fitting said groove on the other, the outer edges of said land defining circles of equal diameter.

4. Improvement according to claim 1, including at least one loose ring arranged in said mould and dimensioned and positioned to be forced by the moulding pressure against the bottom of the mould at the zones of greatest moulding pressure and spaced from the bottom of the mould outside of the zones of greatest moulding pressure.

5. Improvement according to claim 1, in which said mould is shaped for producing two rows of briquettes, each slanted toward said plane at substantially opposite angles.

6. Improvement according to claim 1, in which said mould is shaped for producing alternate oppositely sloped connected briquettes.

References Cited in the file of this patent

FOREIGN PATENTS

| Number | Country | Date |
| --- | --- | --- |
| 713,849 | Germany | Nov. 17, 1941 |